Figure 1:
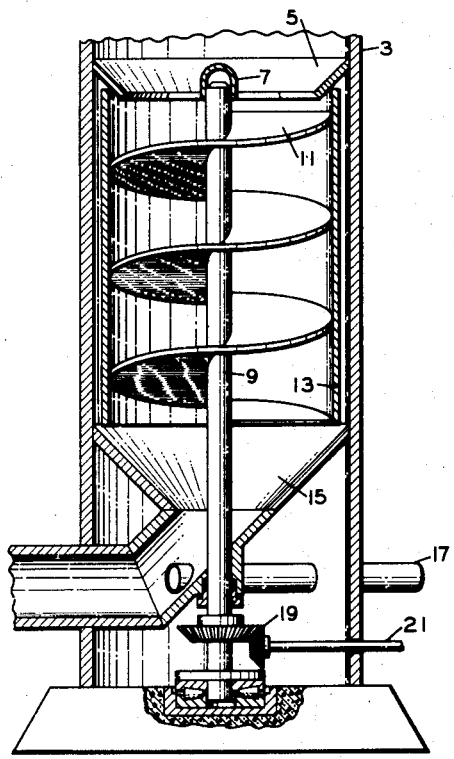

Dec. 29, 1953  D. M. VESPER ET AL  2,664,190
FLOW CONTROL APPARATUS
Filed Dec. 27, 1949

INVENTOR.
H. L. EDWARDS
D. M. VESPER
BY
Hudson and Young
ATTORNEYS

Patented Dec. 29, 1953

2,664,190

UNITED STATES PATENT OFFICE 2,664,190

FLOW CONTROL APPARATUS

Daniel M. Vesper and Harold L. Edwards, Bartlesville, Okla., assignors to Phillips Petroleum Company, a corporation of Delaware Application December 27, 1949, Serial No. 135,226

6 Claims. (Cl. 198—215)

This invention relates to solid material flow means. In one of its more specific aspects it relates to a circular inclined rotatable chute, preferably a spiral chute. In another of its more specific aspects it relates to an apparatus for controlling the rate of flow of and for moving a bed of granular solid material downwardly in a tower.

Devices are known in the prior art for controlling the rate of flow of and for moving solid materials downwardly in a tower. For instance, reciprocating devices are known which transfer solid materials from an upper stationary plate that contains holes which alternately coincide with holes in a reciprocating inner plate so as to pick up granular solid materials from the upper stationary plate and to discharge solid materials from the reciprocating plate into alternately coinciding holes in a lower stationary plate, thus controlling the rate of flow of and moving solid materials from above the upper stationary plate to below the lower stationary plate. Also, the same result is accomplished by utilizing an upper and a lower stationary plate between which rotates a cylindrical shaped plate. In these devices the two stationary plates and the rotating inner plate contain holes which alternately coincide so as to move solid materials from above the upper stationary plate to below the lower stationary plate. Some other devices have been used in the prior art, such as a device whereby an outlet hole is opened and closed at periodic intervals so as to allow a quantity of material to flow from a tower or vessel. The devices of the prior art have certain disadvantages which we have overcome by the apparatus of the process of our invention.

Various treating processes of the prior art, for instance, selective adsorption separation processes, utilize a moving bed of a granular material, such as granular activated-charcoal, silica gel, etc. In most of these treating processes, and particularly in the selective adsorption separation processes, it is necessary to control the rate of flow of the granular solid material through the tower or vessel used to contact the material to be treated with the granular solid material. In selective adsorption processes the granular selective adsorbent moves downwardly through cooling, adsorption, rectification and stripping zones. The rate of descent of the selective adsorbent must be controlled according to the activity and capacity of the selective adsorbent so as to make the process function properly, and to perform the functions of cooling, adsorption, rectification and stripping in an efficient and economical manner. A flow control device is used to control the rate of flow of the selective adsorbent. The flow control devices known in the prior art tend to crush and break-up the selective adsorbent, thus making considerable fines which must be removed from the system. Activated-charcoals, silica gels and other selective adsorbents are relatively expensive, and their replacement adds a major item of cost to the process. Elimination of the loss of selective adsorbents through attrition would make these treating processes more attractive in many new applications, as well as less expensive to operate in existing operations.

We have invented a flow control device which can be used to advantage to control the rate of flow of a solid material downwardly in a vessel. Our circular inclined rotatable chute, preferably a circular inclined spiral chute, is particularly adaptable to controlling the rate of flow of granular selective adsorbents through a tower.

In another embodiment of the apparatus of our invention, we use two of the circular inclined rotatable chutes placed in vertical alignment with a surge-space, preferably a zone of the tower, between them.

The known moving bed treating processes of the prior art, particularly the selective adsorbent separation processes, employing a stripping operation in the lower portion of the tower, utilizes a flow control device to move the solid materials downwardly out of the tower, and in the moving bed selective adsorbent separation processes, the stripped selective adsorbent is usually elevated by gas lift, a mechanical elevator or screw conveyor back into the upper portion of the tower for recycling through the cooling, adsorption, rectification and stripping zones. In many of the selective adsorption separation processes of the prior art, steam is introduced into the stripping zone immediately above the flow control device to strip the adsorbed materials from the selective adsorbent. When using the control means of the prior art difficulty has been encountered with steam passing through the flow control devices and being entrained with the selective adsorbent passing out of the stripping zone. This steam is ultimately carried along with the charcoal into the cooling section of the adsorber wherein it is condensed and adsorbed by the selective adsorbent, thus preventing adsorption of the desired materials during the adsorption step of processing. This problem is more pronounced when using a gas-lift system to elevate the selective adsorbent due to an aspiration effect upon picking up the selective adsorbent at the bottom of the tower. A collecting hopper is usually used in the bottom of the tower to collect the selective adsorbent discharged by the flow control device, and it has been found that maintaining a proper level of selective adsorbent in the hopper overcomes this steam carry-over problem. However, it is very difficult to maintain the proper level of selective adsorbent in the hopper, due to the difficulty of automatically controlling the level of the granular solid material when using a gas-lift device, which is preferable because of the resulting low attrition loss.

We have found that our flow control device overcomes this steam carryover problem, because in using two vertically aligned circular inclined rotatable chutes we provide a margin of safety. A surge space, such as a portion of the tower, is provided between the two circular inclined rotatable chutes, and selective adsorbent is maintained in this surge space as well as in the collecting hopper below the lowermost chute. If the level is lost in the collecting hopper, the selective adsorbent maintained in the surge space will prevent the passage of steam or other gases, and vice versa. In addition, the level of selective adsorbent in the surge space is easier to control than the level in the collecting hopper because it is easier to control the amount discharged by our lowermost chute than to control the amount discharged from the collecting hopper by a gas-lift system. As will be seen hereinafter, we provide for operating two chutes to control the rate of flow through the adsorber as well as the level of the selective adsorbent in the surge chamber and in the collecting hopper. The circular inclined rotatable chute of our invention, as will be seen hereinafter, reduces loss from attrition to a minimum, since there are no grinding or abrading surfaces as in the flow control devices of the prior art, and our flow control means is very easy to regulate so as to discharge a desired quantity of solid material. In addition, many other advantages, as discussed hereinbefore, are realized from using two of our circular inclined rotatable chutes in vertical alignment.

It is an object of this invention to provide solid material flow means.

It is another object of this invention to provide a circular inclined rotatable chute flow means, preferably a circular inclined rotatable spiral chute.

It is a further object of this invention to provide flow control means for controlling the rate of flow of a granular solid material downwardly in a tower with a minimum of loss of granular material through attrition, and with a minimum of loss of gases through the flow control means and thus out of the lower portion of a tower.

Other objects and advantages of this invention will become apparent, to one skilled in the art, upon reading this disclosure.

Figure 2:
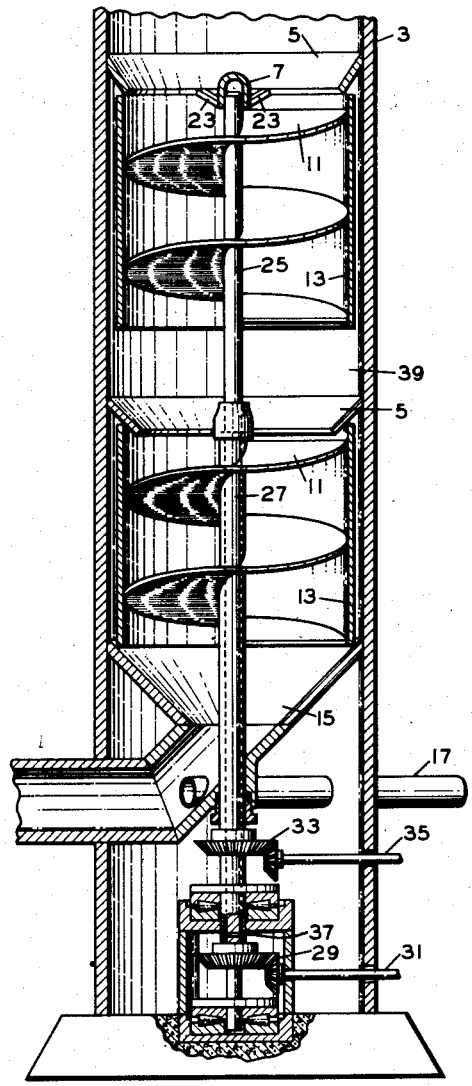

The drawing which accompanies and is a part of this disclosure diagrammatically sets forth specific embodiments of the flow control means of our invention. Figure 1 diagrammatically depicts our flow control means wherein a single circular inclined rotatable spiral chute is used to control the flow. Figure 2 diagrammatically sets forth a flow control means of our invention wherein two circular inclined rotatable spiral chutes are used to control flow. In Figure 2 the two chutes can be operated by the same shaft or each chute can be operated by separate shafts, so as to give any desired control of the rate of flow.

The flow control means of our invention can be used to control the rate of flow of a solid material in a tower. It is particularly adaptable to controlling the rate of flow of granular selective adsorbents, such as activated-charcoal, silica gel, etc., through continuous moving bed selective adsorbent separation equipment, wherein a selective adsorbent having a particle size of from 5 to 60 mesh is utilized.

Referring now to Figures 1 and 2, in the following we will discuss the embodiments of the apparatus of our invention wherein one circular inclined rotatable chute is used and wherein two circular inclined rotatable chutes are used. However, it is to be understood that we are not to be unduly limited by the following discussion of the drawings. Figure 1 depicts our flow control device located in the lower portion of a tower 3 through which a moving bed of granular material, such as selective adsorbents, passes. For instance, the portion of tower 3 immediately above our flow control device is usually a stripping zone wherein adsorbate is stripped from a selective adsorbent in the stripping operation of known moving bed selective adsorbent separation processes. We prefer to use a hopper or baffle 5 with a spider 7 to give support to shaft or center section 9 of a screw which forms the circular inclined plate of our flow control device. Spider 7 preferably consists of a center bearing supported by brackets attached to hopper 5 which is preferably funnel-shaped. Other means can be used to support the upper end of shaft 9, but we find this spider means particularly suitable since attrition losses are cut down by the central covering bearing which can be readily supported by brackets so as to allow the granular material to pass freely into our circular inclined chute. The helical ridge 11 of the screw can be tapered or untapered, but we prefer that it be untapered so that the circular inclined plate formed is flat, as shown in Figure 1. The screw made up of center shaft 9 and helical ridge 11 is inside a cylindrical tube 13 which preferably touches all points along the periphery of helical ridge 11 of the screw and is attached thereto, so that the cylindrical tube and screw rotate together. The screw and cylindrical tube 13 thus form the circular inclined rotatable chute of the apparatus of our invention, and we prefer that the screw have a constant pitch so as to form a circular inclined rotatable spiral chute. If desired, tube 13 and the screw can be tapered so as to be larger in cross-sectional area at the top than at the bottom, or vice versa. However, we prefer that the screw have a constant major diameter and that the tube 13 be cylindrical so as to form a circular inclined spiral chute of constant cross-sectional area. A hopper 15 is provided below the circular inclined chute to collect the granular material discharged from the chute. Line 17 depicts an inlet gas line which is used to supply gas to lift granular material out of hopper 15 and back up into the upper portion of tower 3 for recycling. An elevator or screw conveyor can be used in place of a gas-lift system, and our device can be used to discharge granular material into a hopper which is used as the feed hopper for these lifting systems. The shaft or center section 9 is provided at its lower portion with rotating means, such as gearing means 19 which is supplied power by shaft 21. To start flow or to speed up the rate of flow, shaft or center section 9 is rotated clockwise (when viewed from below) or at an increased rate of speed, or to slow down flow or stop it completely, shaft 9 is stopped or rotated counter-clockwise. If the screw is a left-handed screw, as it can readily be, the opposite of this is true, that is, for example, to start flow or to speed up flow shaft 9 would be rotated counter-clockwise. Shaft 9 is supported at its base in any suitable manner, such as that depicted in Figure 1 wherein roller bearings are used.

Figure 2 diagrammatically depicts another embodiment of the apparatus of our invention wherein two circular inclined rotatable spiral chutes are used. The same reference numerals are used on the same equipment which performs the same function as in Figure 1. In Figure 2 brackets 23 are shown which support the central covering bearing of spider 7 which is used to prevent the shaft of the screw from wobbling. Both of the circular inclined rotatable spiral chutes of Figure 2 can be rotated from the same shaft. However, we prefer to use a shaft 25 for the upper chute and a hollow shaft 27 for the lower chute. The upper shaft 25 is rotated through gearing means 29 with power applied by shaft 31, and the lower shaft 27 is rotated through gearing means 33 with power applied by shaft 35. This dual rotating means allows us to rotate the chutes at the same speed or at different speeds. If desired, a connecting means, such as pin 37, can be used to connect shafts 25 and 27 so that the shafts can be rotated at the same speed through gearing means 29 with power applied by shaft 31. Any other suitable means to accomplish the same results can be used. A surge chamber 39, which in Figure 2 is shown as a portion of tower 3 which we find very suitable, is provided between the upper and lower rotatable chutes. Thus, a level of granular material can be maintained below the upper chute and above the lower chute which adds a margin of safety in preventing gases, such as steam, from escaping out of the bottom of tower 3. Since a level of granular material is normally maintained in hopper 15, these two levels of granular material provide double sealing means to prevent escape of such gases out of the lower portion of tower 3. If one or the other of the levels of granular material in zone 39 and hopper 15 is lost, the level which is not lost affords protection against escape of gases. If a level is lost, it is built up to afford the double protection of having two levels. For example, if the level in zone 39 is lost, the lower chute can be rotated at a slower rate to discharge less granular material, thus building up the level in zone 39. In addition, the rate of withdrawal of granular material from hopper 15 can be varied by the elevation means used to maintain the level of granular material in hopper 15. We find it desirable to use the upper chute to maintain the desired rate of flow through the adsorber and to use the lower chute to maintain the desired sealing level in surge chamber 39. As will be evident, to one skilled in the art, the flow control means, as depicted in Figure 2, gives very close control of the rate of flow as well as giving a high margin of safety in preventing gases from passing out of the bottom of tower 3.

We prefer that cylindrical tube 13 have a length at least equal to and no greater than 1½ times the projected vertical distance of the helical ridge of the screw within the cylindrical tube, and that it have an outer diameter at least ⅓ as great and no greater than the inner diameter of tower 3. However, the chutes can be of any suitable size to perform the function for which they are designed, depending on the shape and size of the tower in which they are used, since in many applications the tower will not be cylindrical as depicted in Figures 1 and 2. We prefer that the screw formed by the helical ridge 11 and center section 9 have constant major and minor diameters, with its major diameter at least 1⅓ times and no greater than 24 times its minor diameter, and from 2 to 8 spirals. In using the flow control means of our invention as depicted in Figures 1 and 2 for controlling the rate of flow of a selective adsorbent, such as activated-charcoal, silica gel, etc., having a particle size of from 5 to 60 mesh, we find that it is desirable to so design our chutes so that no flow of granular material occurs when the chutes are not rotated, that is, flow occurs when the chutes are rotated clockwise or counterclockwise, depending on whether the screw is right or left handed, and flow is increased when the speed of rotation is increased. To accomplish this we find that it is desirable to form the helical ridge of the screw out of a material which gives a smooth surface, such as chrome steel, and to have the pitch dimension of the screw no greater than ⅜ the major diameter of the screw, preferably a pitch dimension of from 1/12 to ⅜ the major diameter of the screw. In using the two or more chute embodiment of our invention, we find it desirable that zone 39 have a height at least ⅛ and no more than 4 times the inner diameter of tower 3.

It is to be understood that the flow control devices of our invention, as depicted in Figures 1 and 2, are only diagrammatic and are not to unduly limit the scope of our invention.

As will be evident to those skilled in the art, various modifications of this invention can be made, or followed, in the light of this disclosure and discussion, without departing from the spirit or scope of this disclosure or from the scope of the claims.

We claim:

1. Flow control apparatus which comprises in combination, a tower, a plurality of serially connected up-right enclosed rotatable spiral chutes spaced apart and disposed one above the other in said tower, means to support and individually rotate such chutes, funnel type baffle means intermediate adjacent ends of said chutes and opening into the upper end of the lower said chute of each adjacent pair, and a hopper at the lower end of the lowermost said chute.

2. Apparatus which comprises, in combination, a fixed vertical cylinder, at least one rotatable vertical cylinder within, shorter than and coaxial said fixed cylinder and each said rotatable cylinder having an external diameter only sufficiently less than the internal diameter of said fixed cylinder as to be freely rotatable therein, at least one shaft vertically and concentrically disposed within said fixed and rotatable cylinders, a helix closed about each said shaft and within each said rotatable cylinder and with its outer periphery adjacent to and fastened against the inside of each said rotatable cylinder, each said helix extending within said rotatable cylinder from the bottom end to near but short of the top end thereof, a funnel-shaped baffle attached to said fixed cylinder adjacent the upper end of each said rotatable cylinder and extending and opening into the upper end of each said rotatable cylinder, a funnel-shaped closure attached to the inner lower end of said fixed cylinder and extending downwardly from the lower end of said rotatable cylinder, an inlet opening at the upper end and an outlet at the lower end of said fixed cylinder, and means for rotating each said shaft and rotatable cylinder.

3. Apparatus for controlling the rate of flow of and for moving a bed of a granular solid material vertically in a cylindrically shaped elongated tower which comprises, in combination two vertically and concentrically disposed shafts; a vertically disposed rotatable helix closed about each of said shafts within the lower portion of said tower, said helices being separated by a zone of said tower between the ends thereof which has a height at least 1/8 but no more than 4 times the inner diameter of said tower, each of said helices being inside a separate cylindrical tube, thereby forming two chutes, each of said tubes having a length between 1 and 1.5 times the vertical length of said helices within said tube, having an outer diameter at least 1/3 as great and no greater than the inner diameter of said tower, touching all points along the periphery of the ridge of said helix within said tube and attached thereto and which rotates with said helix within said tube, each of said helices having constant major and minor diameters, with their major diameters at least 1 1/3 times and no greater than 24 times their minor diameters, from 2 to 8 spirals and a pitch dimension of from 1/12 to 3/8 the major diameter of said helices; a funnel-shaped baffle fixed to said tower and extending and opening downwardly into the upper end of each said separate cylindrical tube, a funnel-shaped closure attached to the inner lower end of said cylindrical tower and extending downwardly from the lower end of the lowermost said inner cylinder, and means to support and rotate each of said helices around their vertical center axis.

4. The apparatus of claim 3 wherein each of said two chutes is the same size and wherein each of said helices is adapted to rotate off the same shaft.

5. The apparatus of claim 4 wherein each of said two chutes is the same size and wherein each of said helices is adapted to rotate off of a different shaft.

6. Apparatus which comprises, in combination: two vertically and concentrically disposed shafts, a vertically disposed rotatable helix closed about each of said shafts in separate cylindrical tubes, forming two chutes, said tubes touching all points along the periphery of the ridge of said helix within said tube and attached thereto and which rotate with said helix within said tube, a funnel-shaped baffle fixed to said tower and extending and opening downwardly into the upper end of each said separate cylindrical tube, a funnel-shaped closure attached to the inner lower end of said cylindrical tower and extending downwardly from the lower end of the lowermost said inner cylinder, and means to support and rotate said helices around their vertical center axis.

DANIEL M. VESPER.
HAROLD L. EDWARDS.

References Cited in the file of this patent
UNITED STATES PATENTS

| Number | Name | Date |
|---|---|---|
| 115,431 | Burns | May 30, 1871 |
| 551,852 | Desgoffe | Dec. 24, 1895 |
| 612,181 | Spurrier | Oct. 11, 1898 |
| 745,439 | Holcomb et al. | Dec. 1, 1903 |
| 754,278 | Betz et al. | Mar. 8, 1904 |
| 1,458,850 | Rath | June 12, 1923 |
| 2,043,409 | Heitmann | June 9, 1936 |
| 2,087,813 | Peterson | July 20, 1937 |